United States Patent
Yamashita et al.

(10) Patent No.: US 8,603,692 B2
(45) Date of Patent: Dec. 10, 2013

(54) FUEL CELL STACK

(75) Inventors: Koichiro Yamashita, Toyota (JP);
Junichi Shirahama, Toyota (JP);
Katsuya Matsuoka, Toyota (JP);
Ikuyasu Kato, Kariya (JP); Kazuo Horibe, Toyota (JP); Osamu Hamanoi, Susono (JP); Takuya Hashimoto, Toyota (JP); Hideki Kubo, Seto (JP); Masahiro Shiozawa, Okazaki (JP); Ryo Akagawa, Okazaki (JP)

(73) Assignees: Toyota Jidosha Kabushiki Kaisha, Toyota-Shi (JP); Nippon Soken, Inc., Nishio-Shi (JP)

( * ) Notice: Subject to any disclaimer, the term of this patent is extended or adjusted under 35 U.S.C. 154(b) by 998 days.

(21) Appl. No.: 12/374,935

(22) PCT Filed: Jul. 25, 2007

(86) PCT No.: PCT/JP2007/065034
§ 371 (c)(1),
(2), (4) Date: Apr. 6, 2009

(87) PCT Pub. No.: WO2008/020545
PCT Pub. Date: Feb. 21, 2008

(65) Prior Publication Data
US 2009/0325016 A1 Dec. 31, 2009

(30) Foreign Application Priority Data
Jul. 26, 2006 (JP) ................................. 2006-203759
Oct. 23, 2006 (JP) ................................. 2006-287955

(51) Int. Cl.
*H01M 8/04* (2006.01)
(52) U.S. Cl.
USPC ........................................................ 429/435

(58) Field of Classification Search
USPC ........................................................ 429/435
See application file for complete search history.

(56) References Cited

U.S. PATENT DOCUMENTS

2002/0146612 A1* 10/2002 Sugiura et al. .................. 429/32

FOREIGN PATENT DOCUMENTS

| CA | 2 389 503 A1 | 12/2002 |
|---|---|---|
| CA | 2 494 196 A1 | 3/2004 |
| DE | 11 2004 002 313 T5 | 10/2006 |
| DE | 102 36 998 B4 | 1/2008 |

(Continued)

OTHER PUBLICATIONS

Office Action issued Feb. 23, 2011 in corresponding DE application and English translation thereof.

(Continued)

*Primary Examiner* — Joseph S Del Sole
*Assistant Examiner* — Erin Snelting
(74) *Attorney, Agent, or Firm* — Kenyon & Kenyon LLP

(57) ABSTRACT

A fuel cell stack comprises a stack of three or more fuel cells, each having an assembly in which an anode electrode and a cathode electrode are respectively joined to either side of an electrolytic membrane. The anode electrode is provided nearer to one end, in the stack direction of the fuel cell, than the cathode electrode. Temperature regulating parts for regulating the temperature of the anode electrode of one fuel cell of any two adjacent fuel cells and the cathode electrode of the other fuel cell are disposed at a plurality of positions arranged in the stack direction. The provided temperature regulating parts perform temperature regulation so that the heat dissipating capability of the anode electrode is different in the stack direction from that of the cathode electrode.

12 Claims, 9 Drawing Sheets

(56) References Cited

FOREIGN PATENT DOCUMENTS

| | | |
|---|---|---|
| JP | 59-037663 A | 3/1984 |
| JP | 60-068562 A | 4/1985 |
| JP | 05-190193 A | 7/1993 |
| JP | 08-306380 A | 11/1996 |
| JP | 08-321314 A | 12/1996 |
| JP | 09-092322 A | 4/1997 |
| JP | 2001-015138 A | 1/2001 |
| JP | 2001-057218 A | 2/2001 |
| JP | 2001-357869 A | 12/2001 |
| JP | 2002-260709 A | 9/2002 |
| JP | 2002-313386 A | 10/2002 |
| JP | 2003-045451 A | 2/2003 |
| JP | 2003-338305 A | 11/2003 |
| JP | 2004-311279 A | 11/2004 |
| JP | 2005-019223 A | 1/2005 |
| JP | 2005-166304 A | 6/2005 |
| JP | 2005-174859 A | 6/2005 |
| JP | 2005-197150 A | 7/2005 |
| JP | 2005-203313 A | 7/2005 |
| JP | 2006-179381 A | 7/2006 |
| JP | 2006-210351 A | 8/2006 |
| JP | 2007-250353 A | 9/2007 |
| JP | 2008-021533 A | 1/2008 |
| JP | 2008-034381 A | 2/2008 |
| JP | 2008-041505 A | 2/2008 |
| JP | 2008-108498 A | 5/2008 |
| JP | 2008-108610 A | 5/2008 |
| WO | WO 02/082573 A1 | 10/2002 |

OTHER PUBLICATIONS

Office Action issued Mar. 1, 2011 in corresponding Canadian application No. 2,659,043.

Office Action issued Apr. 3, 2012 in corresponding Japanese application No. 2006-287955 & English translation thereof.

\* cited by examiner

FUEL CELL STACK

This is a 371 national phase application of PCT/JP2007/065034 filed 25 Jul. 2007, claiming priority to Japanese Patent Applications No. JP 2006-203759 filed 26 Jul. 2006, and No. JP 2006-287955 filed 23 Oct. 2006, respectively, the contents of which are incorporated herein by reference.

TECHNICAL FIELD

The present invention relates to a fuel cell stack comprising a stack in which fuel cells are stacked.

BACKGROUND ART

In a fuel cell stack, a stack is formed by laminating a plurality of fuel cells, each comprising a membrane electrode assembly (MEA) in which an anode electrode and a cathode electrode are respectively joined to either side of an electrolytic membrane. In each of the fuel cells, a fuel gas and an oxidant gas are respectively fed into the anode electrode and the cathode electrode, to thereby cause an electrochemical reaction for generating electric power. During the electrochemical reaction, because thermal energy is also generated in addition to electrical energy, cooling water is passed through a cooling water channel formed between fuel cells which are adjacent to each other, to cool each of the fuel cells.

When each of the fuel cells is cooled, however, there are some fuel cells which are more likely than others to be lowered in temperature by heat dissipation into the outside. For example, in fuel cells located close to an end part in a stack direction of the stack, because a lot of heat is radiated from a terminal electrode (a current collector) for extracting electrical power, an end plate disposed to retain the stacked fuel cells, or the like, the temperature of the fuel cells will be easily lowered. Such fuel cells whose temperature is lowered are prone to formation of condensation due to condensed water vapor, which tends to result in degradation in power generating performance of those fuel cells.

JP 8-306380 A discloses a structure in which a heat insulating barrier or a heater is installed at an end part of a stack in a stack direction. In this Publication of JP H08-306380, the heat insulating barrier or the heater is designed to suppress the lowering of temperature of fuel cells located in the vicinity of the end part of the stack in the stack direction. However, by simply suppressing the lowering of temperature of the fuel cells, it is difficult to realize water vapor being adequately prevented from condensing in the fuel cells, and accordingly preventing degradation of power generating performance of the fuel cell to a sufficient degree.

DISCLOSURE OF THE INVENTION

The present invention is directed to provide a fuel cell stack capable of sufficiently preventing fuel cells from degrading in power generating performance.

A fuel cell stack according to the present invention is summarized as a fuel cell stack comprising a stack of three or more fuel cells, each having an assembly in which an anode electrode and a cathode electrode are respectively joined to either side of an electrolytic membrane, the anode electrode being located closer to one end of a stack direction of the fuel cells than the cathode electrode. In the fuel cell stack, temperature regulating parts, each of which is provided between the anode electrode of one fuel cell of adjacent fuel cells and the cathode electrode of the other fuel cell for regulating the temperatures of the anode electrode and the cathode electrode, are disposed at a plurality of sites along the stack direction. The temperature regulating parts provided at the plurality of sites perform temperature regulation to cause a difference in heat dissipating capability between the anode electrode and the cathode electrode to be varied along the stack direction.

Further, the fuel cell stack according to the present invention is summarized as a fuel cell stack comprising a stack of three or more fuel cells, each having an assembly in which an anode electrode and a cathode electrode are respectively joined to either side of an electrolytic membrane, the anode electrode being located closer to one end of a stack direction of the fuel cells than the cathode electrode. Temperature regulating parts, each of which is provided between the anode electrode of one fuel cell of adjacent fuel cells and the cathode electrode of the other fuel cell for regulating the temperatures of the anode electrode and the cathode electrode, are disposed at a plurality of sites along the stack direction. At least one but not all of the temperature regulating parts provided at the plurality of sites performs temperature regulation to bring about a difference in heat dissipating capability between the anode electrodes and the cathode electrode.

Still further, the fuel cell stack according to the present invention is summarized as a fuel cell stack comprising a stack of three or more fuel cells, each having an assembly in which an anode electrode and a cathode electrode are respectively joined to either side of an electrolytic membrane, the anode electrode being located closer to one end, in a stack direction of the fuel cell, than the cathode electrode. A temperature regulating part for causing an amount of heat exchange between an anode electrode in one of adjacent fuel cells and a cathode electrode in the other of the fuel cells to be varied along the stack direction is provided.

According to the present invention, in the fuel cell stack in which the fuel cells are stacked, the temperature of each of the fuel cells can be appropriately regulated depending on locations of the fuel cells to thereby reduce the difference in temperature between the cathode electrode and the anode electrode. As a result, it becomes possible to sufficiently suppress degradation in power generating performance of the fuel cells.

BEST MODE FOR CARRYING OUT THE INVENTION

With reference to the drawings, preferred embodiments of the present invention will be described below.

Embodiment 1

Figure 1:
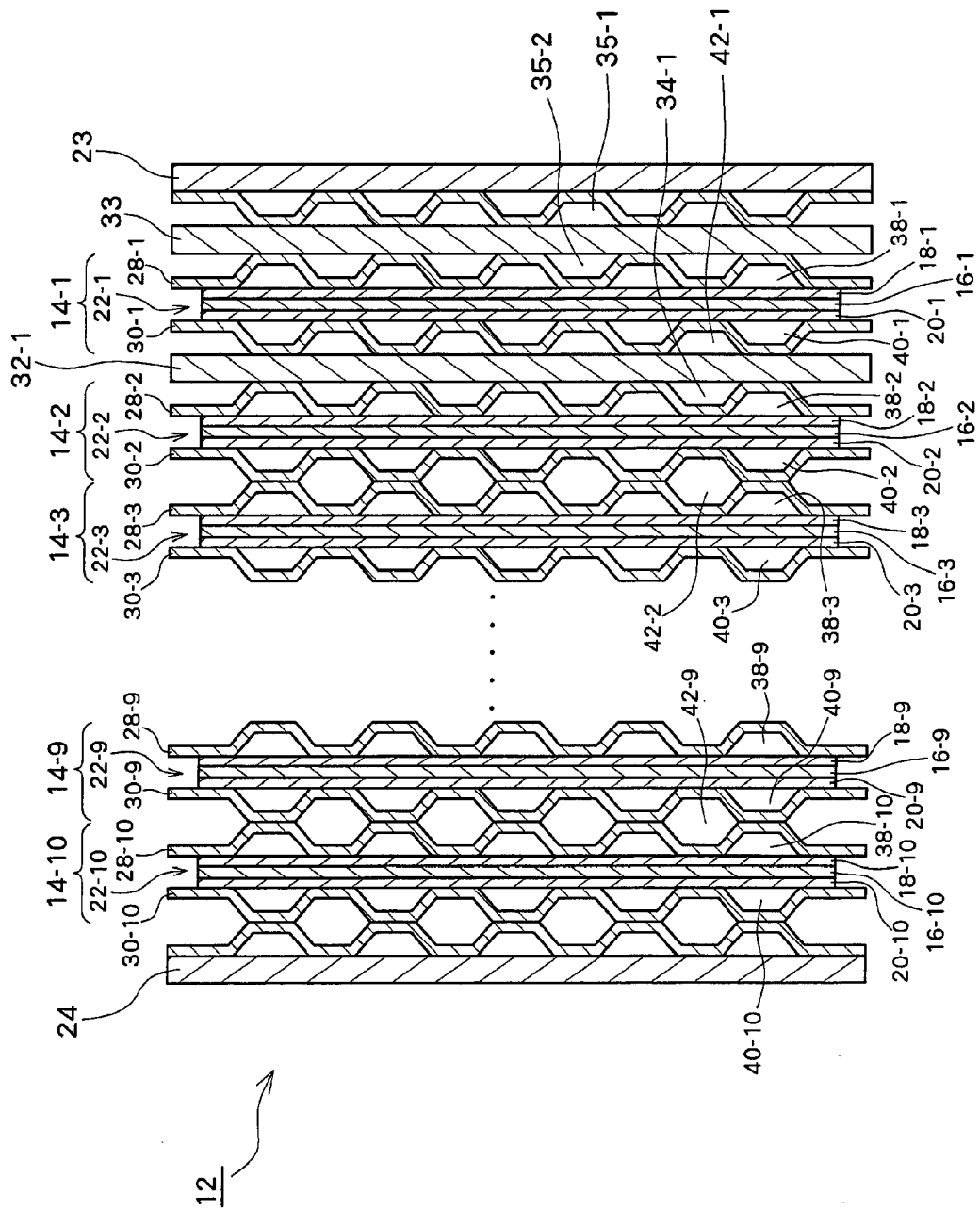
FIG. 1 is a diagram showing a schematic configuration of a fuel cell stack according to a first embodiment of the present invention.

FIG. 1 is a diagram showing a schematic configuration of a fuel cell stack according to a first embodiment of the present invention. The fuel cell stack according to this embodiment comprises a stack 12 in which n fuel cells 14-1 to 14-n (where n represents an integer greater than or equal to 3) are stacked. Note that FIG. 1 shows, by way of example, a case where 10 fuel cells 14-1 to 14-10 are arranged from one end in a stack direction to the other end in order of the fuel cells from 14-1 to 14-10 (where n=10). In the stack 12, however, the number of the fuel cells 14-1 to 14-n to be stacked may be specified to any number in a range greater than or equal to 3 (n≥3).

A fuel cell 14-m (where m is an integer from 1 through n) includes a membrane electrode assembly (hereinafter referred to as an MEA) 22-m, in which an electrolytic membrane 16-m is joined on one side to an anode electrode 18-m and on the other side to a cathode electrode 20-m, an anode side separator 28-m disposed so as to be opposed to the anode electrode 18-m, and a cathode side separator 30-m disposed so as to be opposed to the cathode electrode 20-m. The MEA 22-m is retained between the anode side separator 28-m and the cathode side separator 30-m. In the fuel cell 14-m, the anode electrode 18-m is located closer to one end, in a direction along which the fuel cells 14-1 to 14-n are stacked (hereinafter referred to as a stack direction), than the cathode electrode 20-m. It should be noted that although FIG. 1 shows an example of using a metallic separator as the anode side separator 28-m and the cathode side separator 30-m, a carbon separator may be used for the anode side separator 28-m and the cathode side separator 30-m in this embodiment.

In the fuel cell 14-m, concave and convex portions are formed on the anode side separator 28-m to thereby create, between the anode electrode 18-m and the anode side separator 28-m, an anode gas flow channel 38-m which communicates with an anode gas feed port and an anode gas discharge port (not illustrated), and through which a fuel gas (an anode gas) flows. On the other hand, concave and convex portions are formed on the cathode side separator 30-m to thereby create, between the cathode electrode 20-m and the cathode side separator 30-m, a cathode gas flow channel 40-m which communicates with a cathode gas feed port and a cathode gas discharge port (not illustrated), and through which an oxidant gas (a cathode gas) flows. In the fuel cell 14-m, the fuel gas introduced from the anode gas feed port into the anode gas flow channel 38-m is supplied to the anode electrode 18-m, while the oxidant gas introduced from the cathode gas feed port into the cathode gas flow channel 40-m is supplied to the cathode electrode 20-m, thereby causing an electrochemical reaction to occur for generating electrical power. When the electrochemical reaction occurs, in addition to generation of electrical energy, thermal energy is also generated. After having been used in the electrochemical reaction, the fuel gas is discharged from the anode gas discharge port, while the oxidant gas is discharged from the cathode gas discharge port. Here, for example, hydrogen ($H_2$) may be used as the fuel gas, and air, for example, may be used as the oxidant gas. The above-described configuration of the fuel cell 14-m is common to each of the fuel cells 14-1 to 14-n (the fuel cells 14-1 to 14-10 in FIG. 1). Then, an anode side terminal electrode (a current collector) 23 is provided to one end part of the stack 12 in the stack direction, and a cathode side terminal electrode (a current collector) 24 is provided to the other end part of the stack 12 in the stack direction.

In the stack 12, an anode electrode 18-(j+1) (j is an integer from 1 through (n−1)) in one 14-(j+1) of mutually adjacent fuel cells 14-j and 14-(j+1) and a cathode electrode 20-j in the other 14-j of the mutually adjacent fuel cells are disposed so as to be opposed to each other across an anode-side separator 28-(j+1) and a cathode side separator 30-j along the stack direction. Further, a refrigerant flow channel 42-j is formed between the mutually adjacent fuel cells 14-j and 14-(j+1), more specifically, between the anode side separator 28-(j+1) (the anode electrode 18-(j+1)) in the fuel cell 14-(j+1) and the cathode side separator 30-j (the cathode electrode 20-j) in the fuel cell 14-j. The refrigerant flow channel through which a cooling liquid (cooling water) used as a refrigerant flows is communicated with a refrigerant supply port and a refrigerant discharge port which are not illustrated. Because the cooling liquid introduced from the refrigerant supply port into the refrigerant flow channel 42-j exchanges heat with the anode electrode 18-(j+1) and the cathode electrode 20-j, heat can be dissipated and carried away from the anode electrode 18-(j+1) and the cathode electrode 20-j, to thereby regulate temperatures of the anode electrode 18-(j+1) and the cathode electrode 20-j (to provide cooling). The cooling liquid having been used in heat exchange is subsequently discharged from the refrigerant discharge port. In this embodiment, the refrigerant flow channel 42-j provided between the anode electrode 18-(j+1) in the fuel cell 14-(j+1) and the cathode electrode 20-j in the fuel cell 14-j in order to cool the anode electrode 18-(j+1) and the cathode electrode 20-j is disposed at a plurality of sites which are different from each other in position along the stack direction. FIG. 1 shows an example where the refrigerant flow channels 42-1 to 42-9 are respectively formed between the fuel cells 14-1 and 14-2, ..., and between the fuel cells 14-9 and 14-10.

Further, a heat insulating barrier 32-1 which has electrically conductive and thermally insulative properties is installed between the anode electrode 18-2 and the cathode electrode 20-1, the anode electrode 18-2 being in one 14-2 of fuel cells 14-1 and 14-2 located adjacent to each other in the vicinity of the anode side terminal electrode 23 (close to the one end part of the stack 12 in the stack direction), and the cathode electrode 20-1 being in the other 14-1 of the fuel cells 14-1 and 14-2. In the example illustrated in FIG. 1, the heat insulating barrier 32-1 is disposed between the cathode side separator 30-1 in the fuel cell 14-1, which is closest to the anode side terminal electrode 23, and the anode-side separator 28-2 in the fuel cell 14-2, which is adjacent to the fuel cell 14-1. Then, a space formed between the heat insulating barrier 32-1 and the cathode side separator 30-1 is configured to function as the refrigerant flow channel 42-1 through which the cooling liquid flows, while a space 34-1 formed between the heat insulating barrier 32-1 and the anode side separator 28-2 is configured to supply no cooling liquid (not to function as the refrigerant flow channel). In other words, the space 34-1 is defined as an air layer by blocking the communication with the refrigerant supply port and the refrigerant discharge port. In this manner, the heat insulating barrier 32-1 is placed between the refrigerant flow channel 42-1 and the anode side separator 28-2 (the anode electrode 18-2) in the fuel cell 14-2. As a result, temperature regulation (heat dissipation) of the anode electrode 18-2 and the cathode electrode 20-1 is performed in such a manner that an amount of heat dissipation (an amount of heat exchange) from the cathode electrode 20-1 of the fuel cell 14-1 into the cooling liquid flowing through the refrigerant flow channel 42-1 becomes greater than the amount of heat dissipation (the amount of heat exchange) from the anode electrode 18-2 of the fuel cell 14-2 into the cooling liquid. This means that the capability of dissipating heat from the cathode electrode 20-1 into the cooling liquid flowing through the refrigerant flow channel 42-1 becomes higher than that of dissipating heat from the anode electrode 18-2 into the cooling liquid.

In the example shown in FIG. 1, other than between the MEAs 22-1 and 22-2, no heat insulating barrier is installed between mutually adjacent MEAs from MEAs 22-2 and 22-3 to MEAs 22-9 and 22-10. Accordingly, a condition where the amount of heat dissipation from the cathode electrode 20-$j$ of the fuel cell 14-$j$ into the cooling liquid flowing through the refrigerant flow channel 42-$j$ is equal to (or almost equal to) that of heat dissipation from the anode electrode 18-($j$+1) of the fuel cell 14-($j$+1) into the cooling liquid is satisfied with respect for any integer $j$ greater than or equal to 2 and smaller than or equal to (n−1). Therefore, in the example shown in FIG. 1, at least one but not all (the refrigerant flow channel 42-1) of the refrigerant flow channels 42-1 to 42-9 formed at the plurality of sites perform temperature regulation to cause the amount of heat dissipation from the cathode electrode 20-1 to be greater than that of heat dissipation from the anode electrode 18-2, which in turn causes a difference in the amount of heat dissipation (the heat dissipating capability) between the cathode electrode 20-$j$ and the anode electrode 18-($j$+1) to be varied along the stack direction (depending on a value of $j$).

In this embodiment, because the anode side separator 28-($j$+1) contacts the cathode side separator 30-$j$ whenever $j$ is an integer of from 2 through (n−1), heat is always exchanged between the anode electrode 18-($j$+1) and the cathode electrode 20-$j$. On the other hand, because the heat insulating barrier 32-1 is installed between the anode side separator 28-2 and the cathode side separator 30-1, the amount of heat exchange between the anode electrode 18-2 and the cathode electrode 20-1 becomes smaller than any other amounts of heat exchange between the anode electrode 18-($j$+1) and the cathode electrode 20-$j$. As such, in at least one but not all (the fuel cells 14-1 and 14-2) pairs of mutually adjacent fuel cells (the fuel cells 14-1 and 14-2, the fuel cells 14-2 and 14-3, . . . the fuel cells 14-(n−1) and 14-n), the heat insulating barrier 32-1 is installed between the anode electrode 18-2 in one 14-2 of the pair (the fuel cells 14-1 and 14-2) and the cathode electrode 20-1 in the other 14-1, which causes the amount of heat exchange between the anode electrode 18-($j$+1) in one 14-($j$+1) of mutually adjacent fuel cells 14-$j$ and 14-($j$+1) (where $j$ represents an integer from 1 through (n−1)) and the cathode electrode 20-$j$ in the other 14-$j$ of the mutually adjacent fuel cells to be varied along the stack direction (depending on the value of $j$).

Further, in this embodiment, a heat insulating barrier 33 which has electrically conductive and thermally insulative properties is located further toward the one end, in the stack direction, than the anode electrode 18-1 in the fuel cell 14-1 which is adjacent to the anode side terminal electrode 23. In the example shown in FIG. 1, the heat insulating barrier 33 is disposed between the anode side terminal electrode 23 and the anode side separator 28-1 in the fuel cell 14-1. Then, both a space 35-1 formed between the heat insulating barrier 33 and the anode side terminal electrode 23 and a space 35-2 formed between the heat insulating barrier 33 and the anode side separator 28-1 are configured to supply no cooling liquid (not to function as the refrigerant flow channel). In other words, the spaces 35-1 and 35-2 are also established as the air layer by blocking the communication with the refrigerant supply port and the refrigerant discharge port. In addition, the heat insulating barrier 32-1 is also disposed, as described above, between the fuel cells 14-1 and 14-2 located in the vicinity of the end part of the stack 12 in this embodiment.

Here, the reason for providing the heat insulating barriers not only at the end part of the stack 12 but also between the fuel cells 14-1 and 14-2 in the stack 12 in this embodiment will be described. If the heat insulating barrier 32-1 is not provided between the fuel cells 14-1 and 14-2, the cathode electrode 20-1 situated toward the fuel cell 14-2 in the fuel cell 14-1 undergoes a significant increase in temperature as a result of smooth heat exchange with the fuel cell 14-2 whose temperature is higher than that of the fuel cell 14-1. On the other hand, the anode electrode 18-2 situated toward the fuel cell 14-1 in the fuel cell 14-2 undergoes a significant decrease in temperature as a result of smooth heat exchange with the fuel cell 14-1 whose temperature is lower than that of the fuel cell 14-2. From this fact, a large temperature difference is produced between the anode electrode 18-1 and the cathode electrode 20-1 in the fuel cell 14-1, while a large temperature difference is also produced between the anode electrode 18-2 and the cathode electrode 20-2 in the fuel cell 14-2. It should be noted that a temperature distribution develops in the stack 12 when there is a difference between the temperature of the stack 12 (for example, an average temperature of the fuel cells 14-1 to 14-n) and an ambient temperature. For example, when the ambient temperature is lower than the temperature of the stack 12, the temperature of the stack 12 is gradually decreased from the fuel cell at the center toward the fuel cell at the end part. Conversely, when the ambient temperature is higher than the temperature of the stack 12, the temperature of the stack 12 is gradually increased from the fuel cell at the center toward the fuel cell at the end part. In either of these cases, the temperature distribution develops not only among the fuel cells 14-1 to 14-n, but also between poles within a single fuel cell 14-$m$. The temperature distribution within the fuel cell 14-$m$ becomes more pronounced as the difference between the temperature of the stack 12 and the ambient temperature becomes greater.

In the fuel cell 14-$m$, when the temperature difference is produced between the cathode electrode 20-$m$ and the anode electrode 18-$m$, water vapor moves, passing through the electrolytic membrane 16-$m$ from one of the electrodes having a higher temperature to the other of the electrodes having a lower temperature. For example, in the fuel cell 14-1 located close to the anode side terminal electrode 23, because the temperature of the anode electrode 18-1 which is on an outer side in the stack direction tends to become lower than that of the cathode electrode 20-1 which is on an inner side in the stack direction, water vapor can move easily from the cathode electrode 20-1 to the anode electrode 18-1, passing through the electrolytic membrane 16-1. Also in the fuel cell 14-2 located close to the anode side terminal electrode 23, the temperature of the anode electrode 18-2 similarly tends to become lower than that of the cathode electrode 20-2, which allows water vapor to move easily from the cathode electrode 20-2 through the electrolytic membrane 16-2 to the anode electrode 18-2. In addition, because the temperature difference to be produced between the cathode electrode 20-$m$ and the anode electrode 18-$m$ varies depending on the location of the fuel cell 14-$m$ (along the stack direction), the amount of water vapor which passes through the electrolytic membrane 16-$m$ changes in accordance with the location of the fuel cell 14-$m$. When compared with the fuel cells 14-1, 14-2 located close to the anode side terminal electrode 23, because the fuel cell 14-$m$ located, for example, in the vicinity of the central part of the stack 12 along the stack direction is less likely to produce the temperature difference between the cathode electrode 20-$m$ and the anode electrode 18-$m$, the amount of water vapor which passes through the electrolytic membrane 16-$m$ becomes smaller. When the water vapor having moved in the anode electrodes 18-1, 18-2 which tend to undergo the lowering of temperature condenses and remains in those electrodes, power generating performance of the fuel cells 14-1, 14-2 is easily deteriorated. Especially in the anode electrodes 18-1, 18-2, because a supply flow rate of fuel gas (hydrogen gas) is lower than that of the oxidant gas (air), the condensed water tends to remain in those electrodes. It is therefore desired that the temperature of each of the fuel cells 14-1 to 14-$n$ is regulated so as to reduce a temperature difference between the cathode electrode 20-$m$ and the anode electrode 18-$m$, which varies depending on the location of the fuel cell 14-$m$.

In order to achieve this, the heat insulating barrier 32-1 is disposed between the refrigerant flow channel 42-1 and the anode electrode 18-2 in the fuel cell 14-2 in this embodiment, to thereby reduce the amount of heat dissipation from the anode electrode 18-2 of the fuel cell 14-2 into the cooling liquid flowing through the refrigerant flow channel 42-1 to less than the amount of heat dissipation from the cathode electrode 20-1 of the fuel cell 14-1 into the cooling liquid. Further, heat exchange between the anode electrode 18-2 and the cathode electrode 20-1 is also reduced. In this way, because the amount of heat dissipation from the anode electrode 18-2 can be reduced, to thereby raise the temperature of the anode electrode 18-2, the difference in temperature between the cathode electrode 20-2 and the anode electrode 18-2 in the fuel cell 14-2 can be reduced. As a result, it is possible to prevent water vapor in the fuel cell 14-2 moving from the cathode 20-2 to the anode electrode 18-2, passing through the electrolytic membrane 16-2. At the same time, efficiency of cooling the cathode electrode 20-1 by means of the cooling liquid flowing through the refrigerant flow channel 42-1 can be improved, and the amount of heat dissipation from the cathode electrode 20-1 can be accordingly increased to thereby lower the temperature of the cathode electrode 20-1, which can lead to reduction of the difference in temperature between the cathode electrode 20-1 and the anode electrode 18-1 in the fuel cell 14-1. As a result, transfer of water vapor which moves from the cathode electrode 20-1 to the anode electrode 18-1, passing through the electrolytic membrane 16-1, can be suppressed. In addition, because the amount of heat dissipation from the anode electrode 18-1 can be reduced by disposing the heat insulating barrier 33 closer to the one end of the stack direction than the anode electrode 18-1 in the fuel cell 14-1, to thereby raise the temperature of the anode electrode 18-1, the difference in temperature between the cathode electrode 20-1 and the anode electrode 18-1 can be further reduced in the fuel cell 14-1.

On the other hand, in the fuel cell 14-$m$ (for example, the fuel cell in the vicinity of the central part of the stack 12) which is less likely to produce the difference in temperature between the cathode electrode 20-$m$ and the anode electrode 18-$m$ compared with the fuel cells 14-1 and 14-2, the amount of heat dissipation from the anode electrode 18-$m$ is substantially equal to that of heat dissipation from the cathode electrode 20-$m$. Consequently, the temperature of the anode electrode 18-$m$ can be maintained almost equal to that of the cathode electrode 20-$m$, which can realize suppression of the transfer of the water vapor through the electrolytic membrane 16-$m$.

According to this embodiment, because at least one but not all (the refrigerant flow channel 42-1) of the refrigerant flow channels 42-1 to 42-9 perform, as described above, temperature regulation for causing the amount of heat dissipation from the cathode electrode 20-1 to become greater than that of heat dissipation from the anode electrode 18-2, thereby changing the difference in the amount of heat dissipation between the cathode electrode 20-$j$ and the anode electrode 18-($j$+1) along the stack direction, the temperature of each of the fuel cells 14-1 to 14-$n$ can be regulated appropriately depending on the locations (along the stack direction) of the fuel cells 14-1 to 14-$n$ so that the difference in temperature between the cathode electrode 20-$m$ and the anode electrode 18-$m$ is suppressed. In addition, the difference in temperature between the cathode electrode 20-$m$ and the anode electrode 18-$m$ can also be reduced by suppressing the heat exchange between the anode electrode 18-2 and the cathode electrode 20-1 using the heat insulating barrier 32-1 to change the amount of heat exchange between the cathode electrode 20-$j$ and the anode electrode 18-($j$+1) along the stack direction. Therefore, in the fuel cells 14-1 to 14-$n$, the transfer of water vapor through the electrolytic membranes 16-1 to 16-$n$ can be prevented, to thereby improve water content distribution with respect to the stack direction of the stack 12. As a result, deterioration of power generating performance of the fuel cells 14-1 to 14-$n$ caused by retention of condensed water can be reliably prevented.

Next, another configuration example according to this embodiment will be described.

In this embodiment, the heat insulating barrier 32-1 installed between the refrigerant flow channel 42-1 and the anode electrode 18-2 may be disposed between the anode side separator 28-2 and the anode gas flow channel 38-2, or between the anode gas flow channel 38-2 and the anode electrode 18-2. When the heat insulating barrier 32-1 is disposed between the anode gas flow channel 38-2 and the anode electrode 18-2, the material or structure of the heat insulating barrier 32-1 should be determined so as to make the heat insulating barrier 32-1 permeable to the fuel gas (hydrogen gas). On the other hand, the heat insulating barrier 33 may be disposed between the anode side separator 28-1 and the anode gas flow channel 38-1 or between the anode gas flow channel 38-1 and the anode electrode 18-1. When the heat insulating barrier 33 is placed between the anode gas flow channel 38-1 and the anode electrode 18-1, the material or structure of the heat insulating barrier 33 is also determined so as to make the heat insulating barrier 33 permeable to the fuel gas. Further, it is also possible to place the heat insulating barrier 33 on an outer side of the anode side terminal electrode 23 in the stack direction. In this case, it is not necessarily required for the heat insulating barrier 33 to possess electrical conductivity, and it is possible to use an electrical insulator.

Further, instead of or in addition to provision of the heat insulating barrier 32-1, a material of the anode side separator 28-2 may be determined so as to have a thermal conductivity lower than that of a material of the cathode side separator 30-1 in this embodiment. Still further, instead of or in addition to the provision of the heat insulating barrier 32-1, a plate thickness (the thickness along the stack direction) of the anode side separator 28-2 may be established so as to be thicker than a plate thickness (the thickness with respect to the stack direction) of the cathode side separator 30-1. Also in the above-described configurations, the amount of heat dissipation from the anode electrode 18-2 in the fuel cell 14-2 can be decreased below the amount of heat dissipation from the cathode electrode 20-1 in the fuel cell 14-1, while the heat exchange between the anode electrode 18-2 and the cathode electrode 20-1 can be suppressed. Further, in this embodiment, by the use of Peltier devices it is possible to realize regulation of the temperatures of the anode electrode 18-2 and the cathode electrode 20-1 so as to make the amount of heat dissipation from the anode electrode 18-2 smaller than that of heat dissipation from the cathode electrode 20-1.

Figure 2:
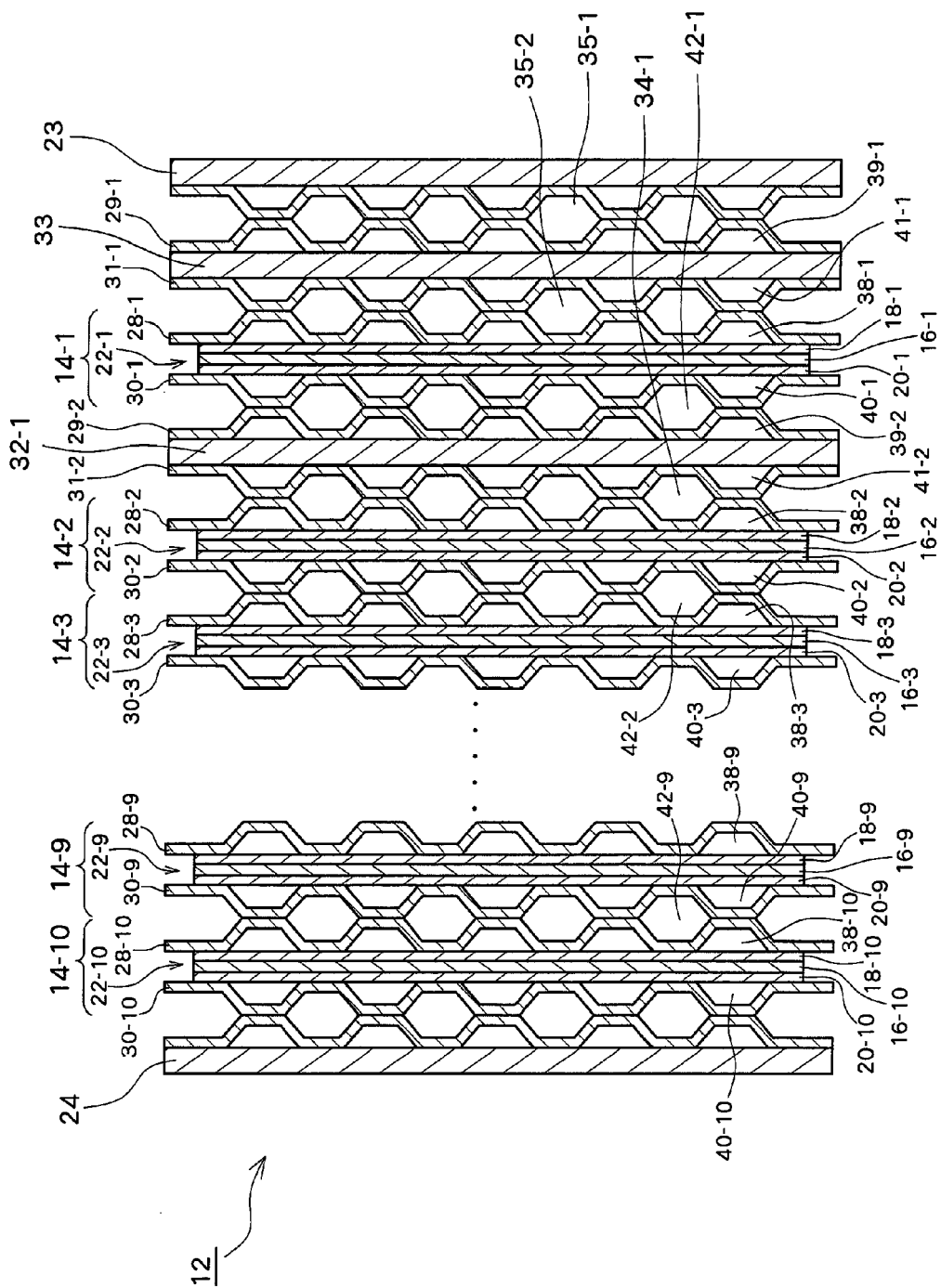
FIG. 2 is a diagram showing another schematic configuration of the fuel cell stack according to the first embodiment of the present invention.

On the other hand, in contrast with the configuration example shown in FIG. 1, a configuration example shown in FIG. 2 includes a separator 29-1 disposed between the anode side terminal electrode 23 and the heat insulating barrier 33, and a separator 31-1 disposed between the heat insulating barrier 33 and the anode side separator 28-1 in the fuel cell 14-1. In other words, the heat insulating barrier 33 is retained between the separators 29-1 and 31-1 in the stack direction. Then, a separator 29-2 is disposed between the cathode side separator 30-1 in the fuel cell 14-1 and the heat insulating barrier 32-1, while a separator 31-2 is disposed between the heat insulating barrier 32-1 and the anode side separator 28-2 in the fuel cell 14-2. In other words, the heat insulating barrier 32-1 is retained between the separators 29-2 and 31-2 in the stack direction. In addition, a space formed between the separator 29-2 and the cathode side separator 30-1 is configured to function as a refrigerant flow channel 42-1, while each of a space 34-1 formed between the separator 31-2 and the anode side separator 28-2, a space 35-1 formed between the separator 29-1 and the anode side terminal electrode 23, and a space 35-2 formed between the separator 31-1 and the anode side separator 28-1 is configured to supply no cooling liquid (not to function as the refrigerant flow channel).

Moreover, an anode gas bypass channel 39-1, which communicates with the not-illustrated anode gas feed port and anode gas discharge port and through which the fuel gas flows, is formed between the heat insulating barrier 33 and the separator 29-1, while an anode gas bypass channel 39-2, which communicates with the anode gas feed port and anode gas discharge port and through which the fuel gas flows, is further formed between the heat insulating barrier 32-1 and the separator 29-2. Besides, a cathode gas bypass channel 41-1, which communicates with the not-illustrated cathode gas feed port and cathode gas discharge port, and through which the oxidant gas flows, is formed between the heat insulating barrier 33 and the separator 31-1, while a cathode gas bypass channel 41-2, which communicates with the cathode gas feed port and the cathode gas discharge port, and through which the oxidant gas flows, is further formed between the heat insulating barrier 32-1 and the separator 31-2.

The stack 12 is supplied, through piping, with reaction gases (the fuel gas and the oxidant gas) containing moisture. For example, when an outside air temperature is low, or when the reaction gasses have high humidity, condensed water on an inner wall surface of the piping is also supplied to the stack 12 together with the reaction gasses. When the amount of condensed water supplied to the fuel cells 14-1 to 14-n is increased, the fuel cells 14-1 to 14-n will become more likely to undergo degradation in power generating performance.

In response to this, the condensed water supplied to the anode gas feed port can be delivered through the anode gas bypass channels 39-1 and 39-2 to the anode gas discharge port, which can prevent the condensed water being supplied together with the fuel gas into the fuel cells 14-1 to 14-n. Similarly, condensed water supplied to the cathode gas feed port can be delivered through the cathode gas bypass channels 41-1 and 41-2 to the cathode gas discharge port, which can prevent the condensed water being supplied together with the oxidant gas into the fuel cells 14-1 to 14-n. Consequently, degradation in power generating performance of the fuel cells 14-1 to 14-n can be suppressed with greater stability.

Moreover, the configuration example shown in FIG. 2 can be realized simply by replacing the MEAs with the heat insulating barriers 32-1 and 33, which can facilitate formation of the stack 12.

Note that either one or both of the anode gas bypass channels 39-1 and the cathode gas bypass channels 41-1 may be formed inside the heat insulating barrier 33 also in the configuration example shown in FIG. 1. Similarly, either one or both of the anode gas bypass channel 39-2 and the cathode gas bypass channel 41-2 may be formed inside the heat insulating barrier 32-1. In the configuration examples shown in FIGS. 1 and 2, however, condensed water need not necessarily be bypassed through the anode gas bypass channels 39-1, 39-2 or the cathode gas bypass channels 41-1, 41-2.

Figure 3:
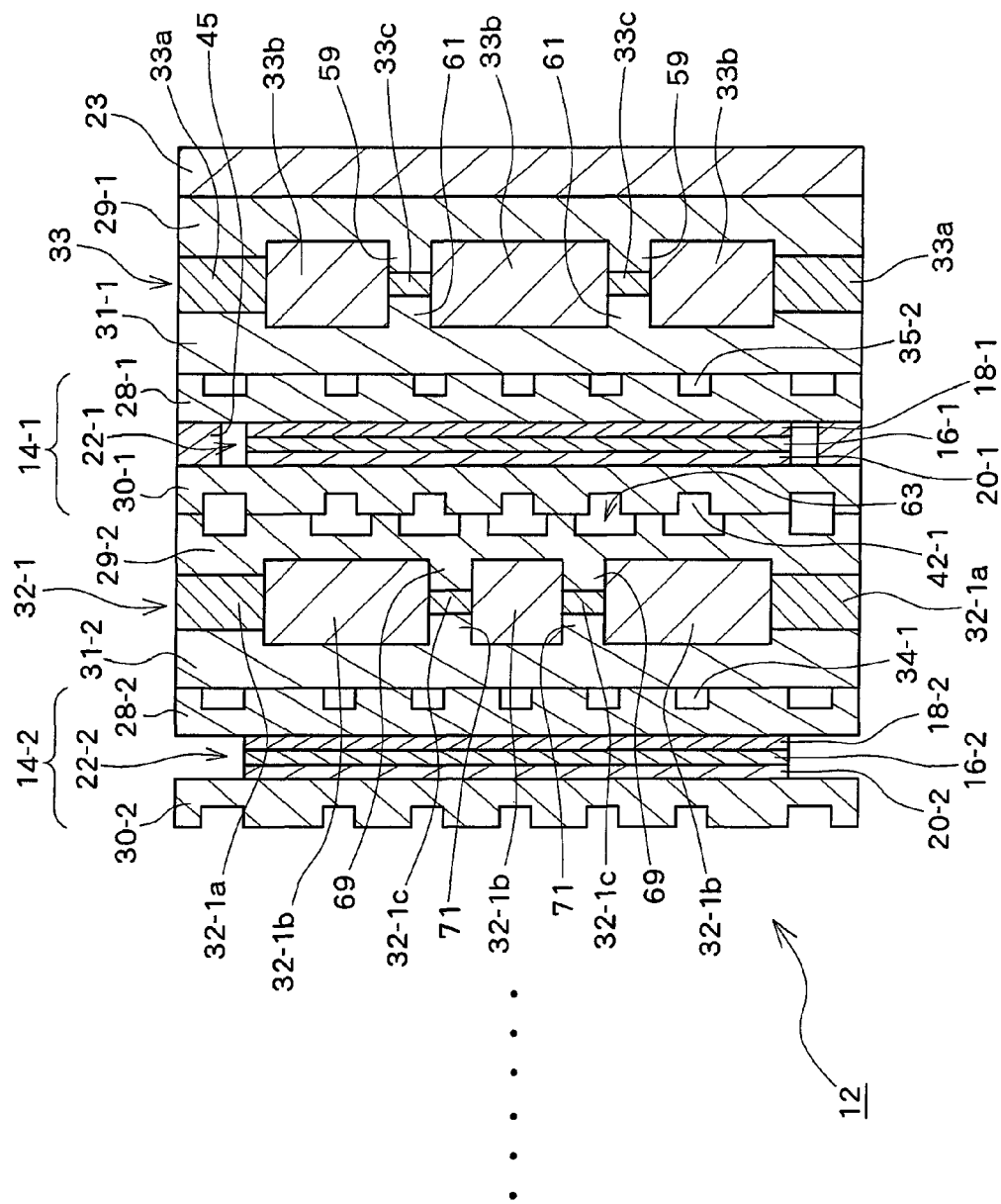
FIG. 3 is a diagram showing still another schematic configuration of the fuel cell stack according to the first embodiment of the present invention.

On the other hand, in a configuration example shown in FIG. 3, protruded portions (convex portions) 59 protruding toward the separator 31-1 are provided to the separator 29-1, while protruded portions (convex portions) 61 protruding toward the separator 29-1 are provided to the separator 31-1 as contrasted with the configuration example shown in FIG. 2. The protruded portions 59 are disposed so as to be opposed to the protruded portions 61 in the stack direction. The heat insulating barrier 33 retained between the separators 29-1 and 31-1 in the stack direction includes heat insulating members 33a and 33b, and includes heat insulating members 33c whose stiffness is higher than that of the heat insulating members 33a and 33b. The heat insulating member 33a, 33b is retained between a region of the separator 29-1 other than a region of the protruded portion 59 and a region of the separator 31-1 other than a region of the protruded portion 61, while the heat insulating member 33c is retained between the protruded portion 59 of the separator 29-1 and the protruded portion 61 of the separator 31-1. A part of the heat insulating barrier 33 (the heat insulating members 33c) retained between the protruded portions 59 and 61 has higher stiffness and a smaller thickness in the stack direction compared with the other part of the heat insulating barrier 33 (the heat insulating members 33a and 33b). In addition, the heat insulating members 33a are outwardly extended further than an outer circumference of the MEA 22-1. It should be noted that in FIG. 3, the anode gas flow channels 38-1, 38-2 and the cathode gas flow channels 40-1, 40-2 are illustrated for convenience of explanation.

In a similar way, protruded portions (convex portions) 69 protruding toward the separator 31-2 are provided to the separator 29-2, while protruded portions (convex portions) 71 protruding toward the separator 29-2 are provided to the separator 31-2. The protruded portions 69 are disposed so as to be opposed to the protruded portions 71 in the stack direction. The heat insulating barrier 32-1 retained between the separators 29-2 and 31-2 in the stack direction includes heat insulating members 32-1a and 32-1b, and includes heat insulating members 32-1c whose stiffness is higher than that of the heat insulating members 32-1a and 32-1b. The heat insulating member 32-1a, 32-1b is retained between a region of the separator 29-2 other than a region of the protruded portions 69 and a region of the separator 31-2 other than a region of the protruded portions 71, while the heat insulating member 32-1c is retained between the protruded portion 69 of the separator 29-2 and the protruded portion 71 of the separator 31-2. In other words, a part of the heat insulating barrier 32-1 (the heat insulating member 32-1c) retained between the protruded portions 69 and 71 has higher stiffness and a smaller thickness in the stack direction compared with the other part of the heat insulating barrier 32-1 (the heat insulating members 32-1*a* and 32-1*b*). In addition, the heat insulating members 32-1*a* are outwardly extended further than the outer circumferences of the MEAs 22-1 and 22-2. Further, a heat insulating member 45 is disposed around the MEA 22-1.

For the heat insulating members 32-1*a*, 32-1*b*, 33*a*, and 33*b* used here, electrically conductive materials are used, whereas the heat insulating members 32-1*c* and 33*c* are not necessarily conductive, and may be composed of an electrical insulator. Materials determined by giving higher priority to heat insulation performance and strength are used for the heat insulating members 32-1*c* and 33*c*, and, for example, epoxy resin, phenol resin, glass fiber, ceramics, or the like may be used.

Then, in the configuration example shown in FIG. 3, a space formed between the separator 31-2 and the anode side separator 28-2 is configured to function as a refrigerant flow channel (an anode side refrigerant flow channel) 34-1 through which the cooling liquid for cooling the anode electrode 18-2 flows, while a space formed between the separator 29-2 and the cathode side separator 30-1 is configured to function as a refrigerant flow channel (a cathode side refrigerant flow channel) 42-1 through which the cooling liquid for cooling the cathode electrode 20-1 flows. That is to say, the heat insulating barrier 32-1 is placed between the refrigerant flow channels 34-1 and 42-1 in the stack direction, while the separator 31-2 faces the refrigerant flow channel 34-1 as well as the heat insulating barrier 32-1, and the separator 29-2 faces the refrigerant flow channel 42-1 as well as the heat insulating barrier 32-1. Further, a space formed between the separator 31-1 and the anode side separator 28-1 is configured to function as a refrigerant flow channel 35-2 through which the cooling liquid for cooling the anode electrode 18-1 flows. In other words, the separator 31-1 faces the refrigerant flow channel 35-2 as well as the heat insulating barrier 33.

Moreover, a part of the separator 29-2 where the separator 29-2 faces the refrigerant flow channel 42-1 is formed in a shape different from the shapes of both a part of the separator 31-2 where the separator 31-2 faces the refrigerant flow channel 34-1 and a part of the separator 31-1 where the separator 31-1 faces the refrigerant flow channel 35-2, in order to make a cross-sectional area of the refrigerant flow channel 42-1 different from the cross-sectional areas of both the refrigerant flow channels 34-1 and 35-1. As a more specific example, depressed portions (concave portions) 63 are formed, as shown in FIG. 3, in the part of the separator 29-2 where the separator 29-2 faces the refrigerant flow channel 42-1, while both the part of the separator 31-2 where the separator 31-2 faces the refrigerant flow channel 34-1 and the part of the separator 31-1 where the separator 31-1 faces the refrigerant flow channel 35-2 are formed in a flat shape without formation of the depressed portions (concave portions). Accordingly, because the cross-sectional area of the refrigerant flow channel 42-1 is greater than the cross-sectional areas of both the refrigerant flow channel 34-1 and the refrigerant flow channel 35-2, a flow rate of the cooling liquid which flows through the refrigerant flow channel 42-1 can be increased to a level greater than the flow rates of both the cooling liquid which flows through the refrigerant flow channel 34-1 and of the cooling liquid which flows through the refrigerant flow channel 35-2. As a result, the amount of heat dissipation from the cathode electrode 20-1 into the cooling liquid flowing through the refrigerant flow channel 42-1 becomes greater than the amounts of heat dissipation from the anode electrode 18-2 into the cooling liquid flowing through the refrigerant flow channel 34-1 and of heat dissipation from the anode electrode 18-1 into the cooling liquid flowing through the refrigerant flow channel 35-2. However, the depressed portions (concave portions) may be formed on a part of the separator 31-2 where the separator 31-2 faces the refrigerant flow channel 34-1 and on a part of the separator 31-1 where the separator 31-1 faces the refrigerant flow channel 35-2. In this case, either or both of the depth and width of the depressed portions facing the refrigerant flow channel 34-1 in the separator 31-2 and depressed portions facing the refrigerant flow channel 35-2 in the separator 31-1 are set to be smaller than those of the depressed portions 63 facing the refrigerant flow channel 42-1 in the separator 29-2, thereby making the cross-sectional areas of the refrigerant flow channels 34-1 and 35-2 smaller than that of the refrigerant flow channel 42-1.

According to the above-described configuration example shown in FIG. 3, even though external force along the stack direction acts on the separators 29-2 and 31-2, causing the separators 29-2 and 31-2 to squeeze the heat insulating barrier 32-1, deformation (crushing due to compression) of the heat insulating barrier 32-1 (the heat insulating members 32-1*a* and 32-1*b*) along the stack direction can be restricted by the protruded portions 69 and 71 provided to the separators 29-2 and 31-2. In this way, the heat insulation performance of the heat insulating barrier 32-1 (the heat insulating members 32-1*a* and 32-1*b*) can be maintained with stability. Moreover, the heat insulating members 32-1*b* can be placed in position by the protruded portions 69 and 71. Then, because the material whose stiffness is higher than that of the heat insulating members 32-1*a* and 32-1*b*, i.e. being more resistant to deformation along the stack direction than the heat insulating members 32-1*a* and 32-1*b* (the material whose deformation volume in the stack direction is smaller with respect for the same magnitude of external force along the stack direction) is used for the heat insulating members 32-1*c* sandwiched between the protruded portions 69 and 71, compressive deformation of the heat insulating members 32-1*a* and 32-1*b* can be further reduced in the stack direction.

Similarly, even though external force along the stack direction acts on the separators 29-1 and 31-1, causing the separators 29-1 and 31-1 to squeeze the heat insulating barrier 33, deformation (crushing due to compression) of the heat insulating barrier 33 (the heat insulating members 33*a* and 33*b*) along the stack direction can be restricted by the protruded portions 59 and 61 provided to the separators 29-1 and 31-1. In this way, the heat insulation performance of the heat insulating barrier 33 (the heat insulating members 33*a* and 33*b*) can be maintained with stability. Moreover, the heat insulating members 33*b* can be placed in position by the protruded portions 59 and 61. Then, because the material whose stiffness is higher than that of the heat insulating members 33*a* and 33*b*, i.e. being more resistant to deformation along the stack direction than the heat insulating members 33*a* and 33*b* (the material whose deformation volume in the stack direction is smaller with the same magnitude of external force along the stack direction) is used for the heat insulating members 33*c* sandwiched between the protruded portions 59 and 61, compressive deformation of the heat insulating members 33*a* and 33*b* can be further reduced in the stack direction.

In addition, according to the configuration example shown in FIG. 3, without changing the structure of the fuel cell 14-1 relative to the other fuel cells 14-2 to 14-*n* (without modifying the shape of the cathode side separator 30-1 relative to the other cathode side separators 30-2 to 30-*n*) it is possible to achieve the cross-sectional area of the refrigerant flow channel 42-1 being made different from the cross-sectional areas of the refrigerant flow channels 34-1 and 35-2, and the amount of heat dissipation from the cathode electrode 20-1 is accordingly made different from those of heat dissipation from the anode electrodes 18-1 and 18-2. Therefore, the stack 12 can be easily formed.

It should be noted that in the configuration example shown in FIG. 3, one of the projections 69 or 71 may be eliminated. When the projections 71 are eliminated, for example, compressive deformation of the heat insulating members 32-1a and 32-1b in the stack direction can be restricted by the protruded portions 69. In addition, because stiffness of the part (the heat insulating member 32-1c) of the heat insulating barrier 32-1 retained between the projection 69 and the separator 31-2 is higher than that of the other part (the heat insulating members 32-1a and 32-1b) of the heat insulating barrier 32-1, the compressive deformation of the heat insulating members 32-1a and 32-1b in the stack direction can be further suppressed. Similarly, in the configuration example shown in FIG. 3, one of the protruded portions 59 or 61 may be eliminated. When the protruded portions 61 are eliminated, for example, the compressive deformation of the heat insulating members 33a and 33b in the stack direction can be restricted by the protruded portions 59. Further, because the stiffness of the part (the heat insulating member 33c) of the heat insulating barrier 33 retained between the projection 59 and the separator 31-1 is higher than that of the other part (the heat insulating members 33a and 33b) of the heat insulating barrier 33, the compressive deformation of the heat insulating members 33a and 33b in the stack direction can be further suppressed.

Further, in the configuration example shown in FIG. 3, even when the heat insulating members 32-1c are eliminated, the compressive deformation of the heat insulating members 32-1a and 32-1b in the stack direction can be restricted by the protruded portions 69 and 71. Similarly, also when the heat insulating members 33c are eliminated, compressive deformation of the heat insulating members 33a and 33b in the stack direction can be restricted by the protruded portions 59 and 61.

Still further, in the configuration example shown in FIG. 3, both the space 34-1 formed between the separator 31-2 and the anode side separator 28-2 and the space 35-2 formed between the separator 31-1 and the anode side separator 28-1 may be configured to supply no cooling liquid (not to function as the refrigerant flow channel).

Figure 4:
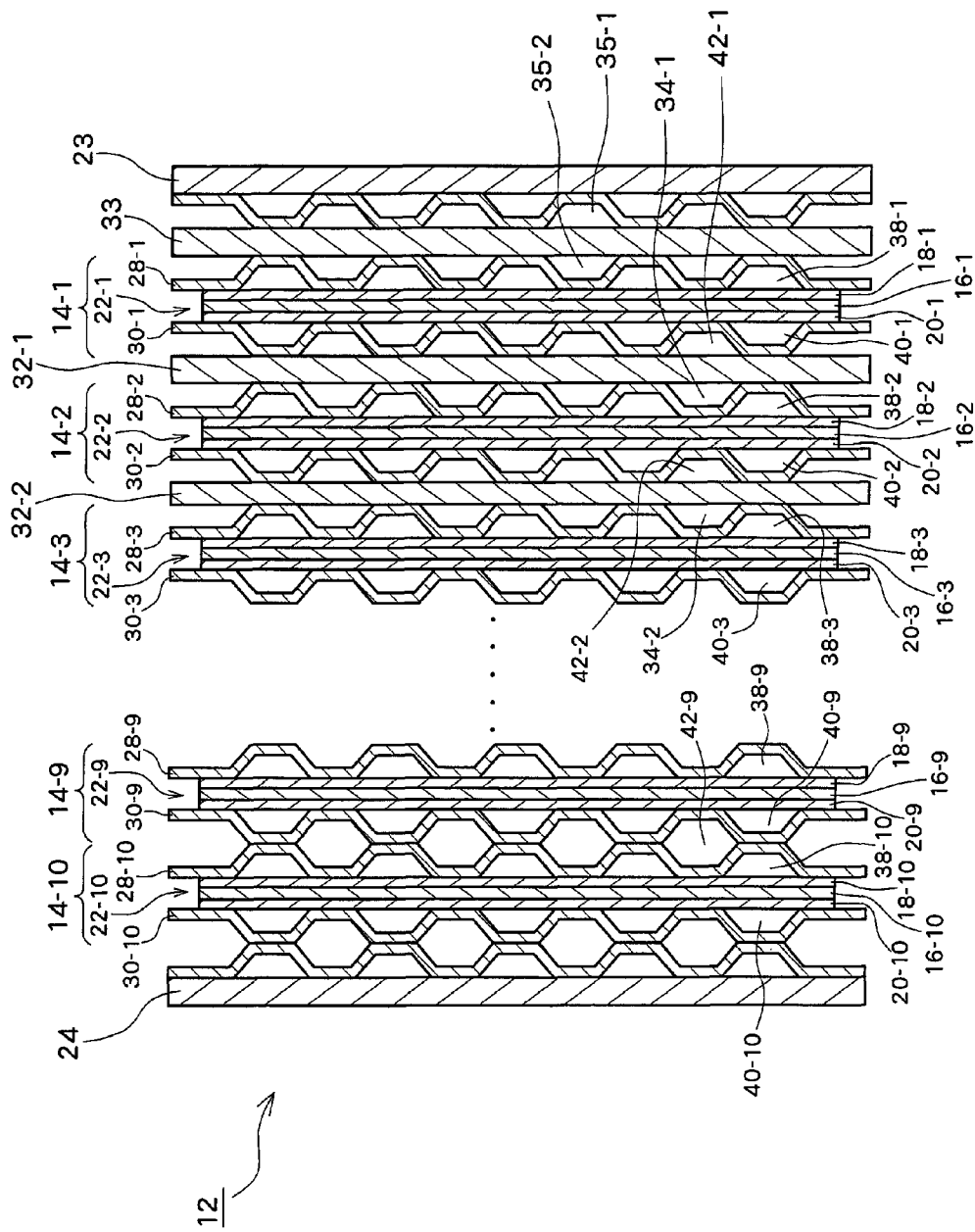
FIG. 4 is a diagram showing a further schematic configuration of the fuel cell stack according to the first embodiment of the present invention.

On the other hand, as the heat insulating barrier located close to the one end part of the stack 12 in the stack direction (in the vicinity of the anode side terminal electrode 23), in addition to the heat insulating barriers 32-1 and 33, a heat insulating barrier 32-2 which has electrically conductive and thermally insulative properties may be disposed, as shown in FIG. 4, for example, between the anode side separator 28-3 (the anode electrode 18-3) in one 14-3 of the fuel cells 14-2 and 14-3 which are adjacent to each other and the cathode side separator 30-2 (the cathode electrode 20-2) in the other 14-2 of the fuel cells 14-2 and 14-3. In a configuration example shown in FIG. 4, a space formed between the heat insulating barrier 32-2 and the cathode side separator 30-2 is configured to function as a refrigerant flow channel 42-2 through which the cooling liquid flows, while a space 34-2 formed between the heat insulating barrier 32-2 and the anode side separator 28-3 is configured to supply no cooling liquid (not to function as the refrigerant flow channel). In this way, the heat insulating barrier 32-2 is placed between the refrigerant flow channel 42-2 and the anode side separator 28-3 (the anode electrode 18-3) in the fuel cell 14-3. As a result, temperatures of the anode electrode 18-3 and the cathode electrode 20-2 are regulated in such a manner that the amount of heat dissipation (the amount of heat exchange) from the cathode electrode 20-2 of the fuel cell 14-1 into the cooling liquid flowing through the refrigerant flow channel 42-2 is greater than that of heat dissipation (the amount of heat exchange) from the anode electrode 18-3 of the fuel cell 14-3 into the cooling liquid. Accordingly, in the configuration example shown in FIG. 4, some (the refrigerant flow channels 42-1 and 42-2) of the refrigerant flow channels 42-1 to 42-9 perform temperature regulation for causing the amounts of heat dissipation from the anode electrodes 18-2 and 18-3 to be respectively greater than those of heat dissipation from the cathode electrodes 20-1 and 20-2. In addition, the amount of heat exchange between the anode electrode 18-3 and the cathode electrode 20-2 is also suppressed by the heat insulating barrier 32-2.

Further, in the configuration example shown in FIG. 4, in order to change the difference in the amount of heat dissipation (heat dissipating capability) between the cathode electrode 20-$j$ and the anode electrode 18-$(j+1)$ along the stack direction (depending on the value of j), heat insulation performance of the heat insulating barrier 32-2 is made different from that of the heat insulating barrier 32-1. For example, the thickness of the heat insulating barrier 32-2 in the stack direction is defined to be thinner than that of the heat insulating barrier 32-1 in the stack direction, thereby lowering heat insulation performance of the heat insulating barrier 32-2 below the heat insulation performance of the heat insulating barrier 32-1. In this way, the difference in the amount of heat dissipation between the cathode electrode 20-2 and the anode electrode 18-2 becomes smaller than that between the cathode electrode 20-1 and the anode electrode 18-2. As a result, in the vicinity of the anode side terminal electrode 23, the difference in the amount of heat dissipation between the cathode electrode 20-$j$ and the anode electrode 18-$(j+1)$ increases toward the anode side terminal electrode 23. Further, the amount of heat exchange between the cathode electrode 20-$j$ and the anode electrode 18-$(j+1)$ is varied along the stack direction (depending on the value of j) by lowering the heat insulation performance of the heat insulating barrier 32-2 below the heat insulation performance of the heat insulating barrier 32-1, so that the amount of heat exchange between the anode electrode 18-3 and the cathode electrode 20-2 becomes greater than that between the anode electrode 18-2 and the cathode electrode 20-1.

According to the configuration example shown in FIG. 4, the amount of heat dissipation from the anode electrode 18-3 in the fuel cell 14-3 can be reduced, to thereby raise the temperature of the anode electrode 18-3, and the amount of heat dissipation from the cathode electrode 20-2 in the fuel cell 14-2 can be increased to thereby lower the temperature of the cathode electrode 20-2. On this occasion, a degree of temperature increase of the anode electrode 18-3 becomes smaller than a degree of temperature increase of the anode electrode 18-2, while a degree of temperature decrease of the cathode electrode 20-2 becomes smaller than that of temperature decrease of the cathode electrode 20-1. Therefore, the difference in temperature between the cathode electrode 20-$m$ and the anode electrode 18-$m$ in the fuel cell 14-$m$ can be suppressed in a more appropriate manner. Note that the configuration for restricting the compressive deformation of the heat insulating barrier 32-1 illustrated in FIG. 3 (the protruded portions 69 and 71) may be applied to the heat insulating barriers 32-1 and 32-2 in the configuration example shown in FIG. 4.

Figure 5:
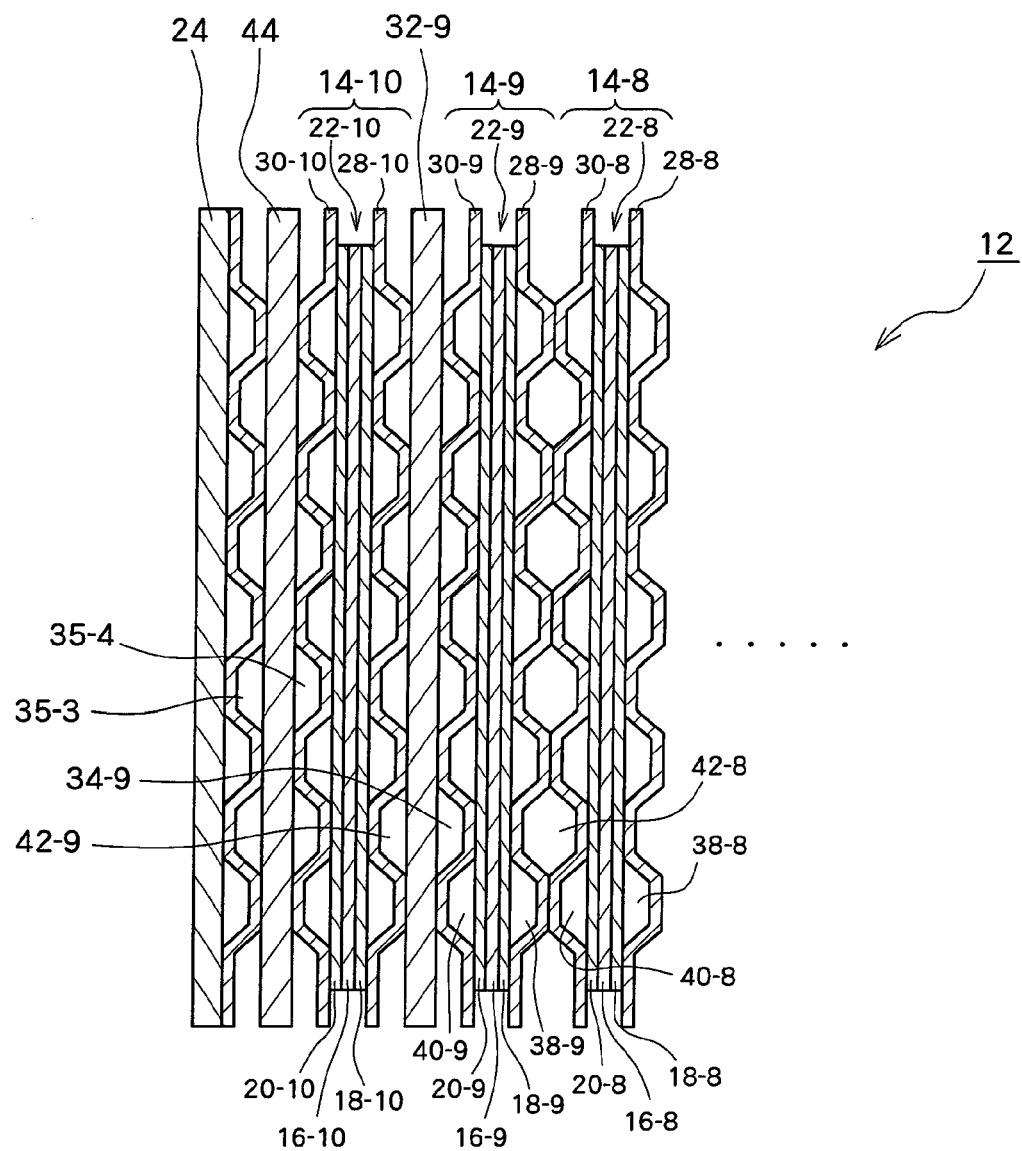
FIG. 5 is a diagram showing a still further schematic configuration of the fuel cell stack according to the first embodiment of the present invention.

Further in this embodiment, a heat insulating barrier 32-9 which has electrically conductive and thermally insulative properties may be installed, as shown in FIG. 5, between the anode electrode 18-10 in one 14-10 of the fuel cells 14-9 and 14-10 adjacent to each other in the vicinity of the cathode side terminal electrode 24 (in the vicinity of the other end part of the stack along the stack direction) and the cathode electrode 20-9 in the other 14-9 of the fuel cells 14-9 and 14-10. In a configuration example shown in FIG. 5, the heat insulating barrier 32-9 is placed between the anode side separator 28-10 in the fuel cell 14-10, which is closest to the cathode side terminal electrode 24, and the cathode side separator 30-9 in the fuel cell 14-9 adjacent to the fuel cell 14-10. Then, a space formed between the heat insulating barrier 32-9 and the anode side separator 28-10 is configured to function as a refrigerant flow channel 42-9, while a space 34-9 formed between the heat insulating barrier 32-9 and the cathode side separator 30-9 is configured so as not to supply the cooling liquid (not to function as the refrigerant flow channel). In this way, the heat insulating barrier 32-9 is placed between the refrigerant flow channel 42-9 and the cathode side separator 30-9 (the cathode electrode 20-9) in the fuel cell 14-9. As a result, the temperatures of the anode electrode 18-10 and the cathode electrode 20-9 are regulated in such a manner that the amount of heat dissipation from the anode electrode 18-10 of the fuel cell 14-10 into the cooling liquid flowing through the refrigerant flow channel 42-9 becomes greater than that from the cathode electrode 20-9 of the fuel cell 14-9 into the cooling liquid. In other words, a capability of dissipating heat from the anode electrode 18-10 into the cooling liquid flowing through the refrigerant flow channel 42-9 is increased above that of dissipating heat from the cathode electrode 20-9 into the cooling liquid. Accordingly, in the configuration example shown in FIG. 5, some (the refrigerant flow channels 42-1 and 42-9) of the refrigerant flow channels 42-1 to 42-9 formed on a plurality of locations perform the temperature regulation for causing the amounts of heat dissipation from the anode electrodes 18-2 and 18-10 to be respectively made different from those of heat dissipation from the cathode electrodes 20-1 and 20-9, so that the difference in the amount of heat dissipation between the anode electrode 18-($j$+1) and the cathode electrode 20-$j$ is varied along the stack direction (depending on the values of $j$). Moreover, because the amount of heat exchange between the anode electrode 18-10 and the cathode electrode 20-9 is reduced by the heat insulating barrier 32-9, the amount of heat exchange between the cathode electrode 20-$j$ and the anode electrode 18-($j$+1) is also varied along the stack direction.

Still further, in the configuration example shown in FIG. 5, a heat insulating barrier 44 having electrically conductive and thermally insulative properties is located further toward the other end in the stack direction than the cathode electrode 20-1 in the fuel cell 14-10 which is adjacent to the cathode side terminal electrode 24. The heat insulating barrier 44 employed here is placed between the cathode side terminal electrode 24 and the cathode side separator 30-10 in the fuel cell 14-10. Then, both a space 35-3 formed between the heat insulating barrier 44 and the cathode side terminal electrode 24 and a space 35-4 formed between the heat insulating barrier 44 and the cathode side separator 30-10 are configured to supply no cooling liquid (not to function as the refrigerant flow channel). In this connection, the heat insulating barrier 44 may be placed further outward than the cathode side terminal electrode 24 in the stack direction. In this case, the heat insulating barrier 44 need not necessarily be conductive, and may be composed of an electrical insulator.

In the fuel cells 14-9 and 14-10 located close to the cathode side terminal electrode 24, the temperature of the cathode electrode 20-10 on an outer side in the stack direction tends to be lower than the temperature of the anode electrode 18-10 on an inner side in the stack direction, while the temperature of the cathode electrode 20-9 tends to be lower than the temperature of the anode electrode 18-9. In response to this, the heat insulating barrier 32-9 is installed, in the configuration example shown in FIG. 5, between the refrigerant flow channel 42-9 and the cathode electrode 20-9 of the fuel cell 14-9, to thereby cause the amount of heat dissipation from the cathode electrode 20-9 of the fuel cell 14-9 into the cooling liquid flowing through the refrigerant flow channel 42-9 to be smaller than that of heat dissipation from the anode electrode 18-10 of the fuel cell 14-10 into the cooling liquid. In addition, the amount of heat exchange between the anode electrode 18-10 and the cathode electrode 20-9 is suppressed. In this way, the amount of heat dissipation from the cathode electrode 20-9 in the fuel cell 14-9 can be reduced, to thereby raise the temperature of the cathode electrode 20-9, which can, in turn, contribute to reduction of the difference in temperature between the anode electrode 18-9 and the cathode electrode 20-9 in the fuel cell 14-9. At the same time, efficiency of cooling the anode electrode 18-10 in the fuel cell 14-10 by means of the cooling liquid flowing through the refrigerant flow channel 42-9 can be improved, and the amount of heat dissipation from the anode electrode 18-10 can be accordingly increased to thereby lower the temperature of the anode electrode 18-10, which can contribute to the reduction of the difference in temperature between the anode electrode 18-10 and the cathode electrode 20-10 in the fuel cell 14-10. Moreover, because the amount of heat dissipation from the cathode electrode 20-10 can be reduced by the heat insulating barrier 44 to raise the temperature of the cathode electrode 20-10, the difference in temperature between the anode electrode 18-10 and the cathode electrode 20-10 can be further reduced in the fuel cell 14-10. Accordingly, it becomes possible to prevent water vapor from moving through the electrolytic membranes 16-9 and 16-10 in the fuel cells 14-9 and 14-10.

It should be noted that in the configuration example shown in FIG. 5, another heat insulating barrier may be installed between the refrigerant flow channel 42-8 and the cathode electrode 20-8 in the fuel cell 14-8. Regarding the heat insulating barrier installed here, it is preferable that heat insulating performance of the heat insulating barrier be set to lower than that of the heat insulating barrier 32-9. As a result, in the vicinity of the cathode side terminal electrode 24, the difference in the amount of heat dissipation between the anode electrode 18-($j$+1) and the cathode electrode 20-$j$ is increased toward the cathode side terminal electrode 24. Further, in the configuration example shown in FIG. 5, the configuration for restricting compressive deformation of the heat insulating barrier 32-1 depicted in FIG. 3 (the protruded portions 69 and 71) may be applied to the heat insulating barrier 32-9, while the configuration for restricting compressive deformation of the heat insulating barrier 33 depicted in FIG. 3 (the protruded portions 59 and 61) may be applied to the heat insulating barrier 44.

Still further, when the temperature difference is likely to occur between the cathode electrode and the anode electrode in the fuel cell located close to the central part of the stack 12, for example, the heat insulating barrier may be installed between the anode electrode in one of fuel cells which are adjacent to each other in the vicinity of the central part of the stack 12 and the cathode electrode in the other of the fuel cells. In addition, the heat insulating barriers 33 and 44 on the end part of the stack 12 may be eliminated in this embodiment.

In the above explanation about the embodiment, it has been described that the refrigerant flow channels 42-1 to 42-9 are provided. In this embodiment, however, even though the refrigerant flow channels 42-1 to 42-9 are not installed, the amount of heat exchange between the cathode electrode 20-*j* and the anode electrode 18-(*j*+1) can be varied along the stack direction by disposing, for example, the heat insulating barrier 32-1 between the anode electrode 18-2 and the cathode electrode 20-1 to reduce the amount of heat exchange between the anode electrode 18-2 and the cathode electrode 20-1, or disposing the heat insulating barrier 32-9 between the anode electrode 18-10 and the cathode electrode 20-9 to reduce the amount of heat exchange between the anode electrode 18-10 and the cathode electrode 20-9. Also in this way, the temperature of each of the fuel cells 14-1 to 14-*n* can be appropriately regulated in accordance with the locations of the fuel cells 14-1 to 14-*n* (along the stack direction), so that the difference in temperature between the cathode electrode 20-*m* and the anode electrode 18-*m* is reduced. Besides, although the anode side separator 28-2 which faces the anode electrode 18-2 and the cathode side separator 30-1 which faces the cathode electrode 20-1 have been described as separate bodies in this embodiment, these separators may be integrated into one body.

Embodiment 2

Figure 6:
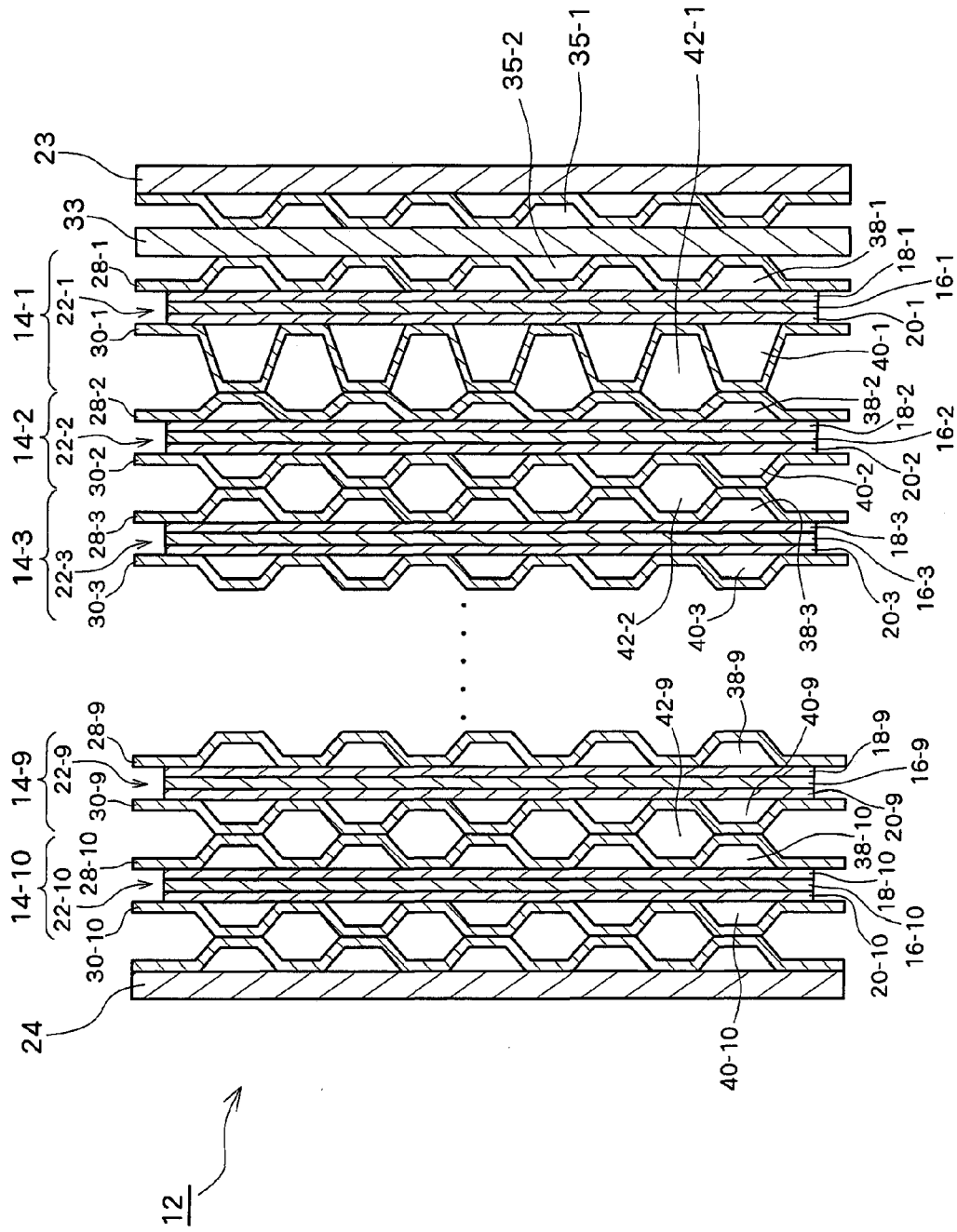
FIG. 6 is a diagram showing a schematic configuration of a fuel cell stack according to a second embodiment of the present invention.
Figure 7:
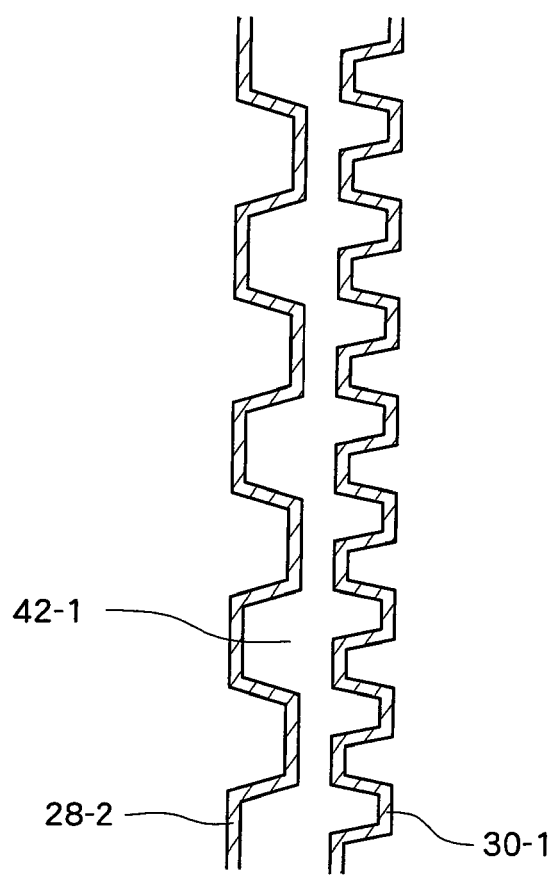
FIG. 7 is a diagram showing another schematic configuration of the fuel cell stack according to the second embodiment of the present invention.

FIG. 6 shows a schematic configuration of a fuel cell stack according to a second embodiment of the present invention. In this embodiment, a depth (with respect to the stack direction) of concave and convex portions formed on the cathode side separator 30-1 in the fuel cell 14-1 is defined to be deeper than that of concave and convex portions formed on the anode side separator 28-2 in the fuel cell 14-2. This is to say, an area of contact between the cooling liquid flowing through the refrigerant flow channel 42-1 and the cathode side separator 30-1 is defined to be greater than an area of contact between the cooling liquid flowing through the refrigerant flow channel 42-1 and the anode side separator 28-2. In this way, the temperatures of the anode electrode 18-2 and the cathode electrode 20-1 can be regulated so as to cause the amount of heat dissipation (the amount of heat exchange) from the cathode electrode 20-1 of the fuel cell 14-1 into the cooling liquid flowing through the refrigerant flow channel 42-1 to be greater than the amount of heat exchange (the amount of heat exchange) from the anode electrode 18-2 of the fuel cell 14-2 into the cooling liquid. Then, a depth of the concave and convex portions of the cathode side separator 30-1 is defined to be deeper than depths of the concave and convex portions of the cathode side separators 30-2 to 30-10, whereas a depth of the concave and convex portions of the anode side separator 28-2 is defined to be shallower than depths of the concave and convex portions of the anode side separators 28-3 to 28-10. In other words, the area of contact between the cooling liquid and the cathode side separator 30-1 is defined to be greater than the area of contact between the cooling liquid and any one of the cathode side separators 30-2 to 30-10, while the area of contact between the cooling liquid and the anode side separator 28-2 is defined to be smaller than the area of contact between the cooling liquid and any one of the anode side separators 28-3 to 28-10. Configurations other than those described above are identical to those in Embodiment 1 (the configuration example depicted in FIG. 1).

Also in this embodiment, because the temperature of the anode electrode 18-2 can be raised by reducing the amount of heat dissipation from the anode electrode 18-2 as in the case of Embodiment 1, the difference in temperature between the cathode electrode 20-2 and the anode electrode 18-2 can be reduced in the fuel cell 14-2. At the same time, because the temperature of the cathode electrode 20-1 can be lowered by increasing the amount of heat dissipation from the cathode electrode 20-1, the difference in temperature between the cathode electrode 20-1 and the anode electrode 18-1 can be reduced in the fuel cell 14-1.

In this embodiment, a pitch of the concave and convex portions formed to the cathode side separator 30-1 may be shorter than that of the concave and convex portions formed to the anode side separator 28-2. Also in this configuration, the area of contact between the cooling liquid flowing through the refrigerant flow channel 42-1 and the cathode side separator 30-1 can be defined to be greater than the area of contact between the cooling liquid flowing through the refrigerant flow channel 42-1 and the anode side separator 28-2.

Also, the area of contact between the cooling liquid flowing through the refrigerant flow channel 42-9 and the anode side separator 28-10 in the fuel cell 14-10 may be defined to be greater than that between the cooling liquid flowing through the refrigerant flow channel 42-9 and the cathode side separator 30-9. As a result, the temperatures of the anode electrode 18-10 and the cathode electrode 20-9 can be regulated so as to cause the amount of heat dissipation from the anode electrode 18-10 of the fuel cell 14-10 into the cooling liquid flowing through the refrigerant flow channel 42-9 to be greater than the amount of heat dissipation from the cathode electrode 20-9 of the fuel cell 14-9 into the cooling liquid.

Embodiment 3

Figure 8:
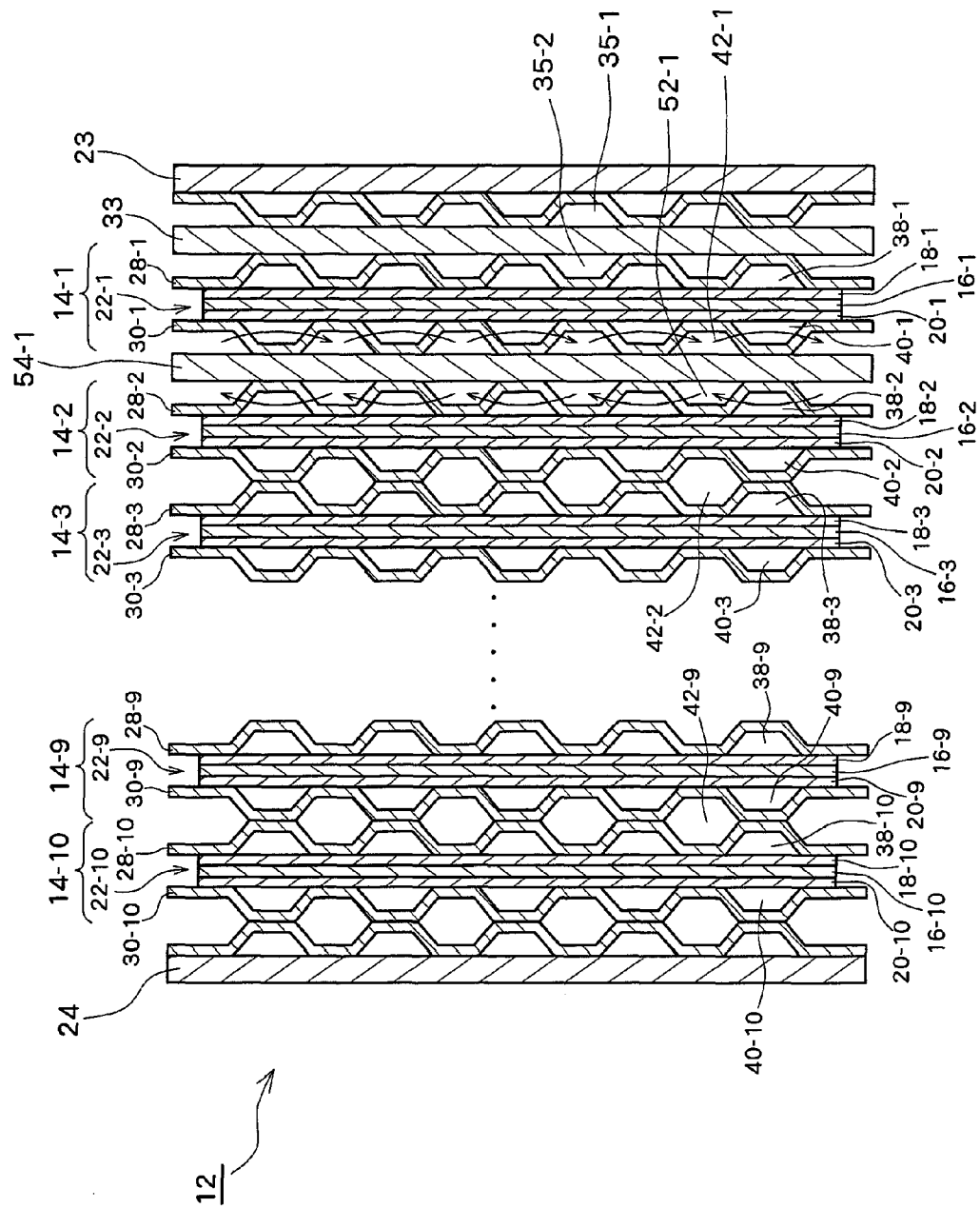
FIG. 8 is a diagram showing a schematic configuration of a fuel cell stack according to a third embodiment of the present invention.

FIG. 8 shows a schematic configuration of a fuel cell stack according to a third embodiment of the present invention. In this embodiment, a partition wall 54-1 is installed between the cathode side separator 30-1 in the fuel cell 14-1 and the anode side separator 28-2 in the fuel cell 14-2. It is preferable that the partition wall 54-1 used here has electrically conductive and thermally insulative properties. Then, a space formed between the partition wall 54-1 and the cathode side separator 30-1 is configured to function as a refrigerant flow channel 42-1 through which the cooling liquid for cooling the cathode electrode 20-1 in the fuel cell 14-1 flows. In addition, a space formed between the partition wall 54-1 and the anode side separator 28-2 is also configured to function as a refrigerant flow channel 52-1 through which the cooling liquid for cooling the anode electrode 18-2 in the fuel cell 14-2 flows. In this embodiment, however, when the cooling liquid is introduced into the refrigerant flow channels 42-1 and 52-1 to dissipate heat from the cathode electrode 20-1 and the anode electrode 18-2, the cooling liquid is first fed into the refrigerant flow channel 42-1 as shown by arrows in FIG. 8, to first perform heat dissipation from the cathode electrode 20-1 (heat exchange with the cathode electrode 20-1). After having been used in heat exchange with the cathode electrode 20-1, the cooling liquid is secondly fed into the refrigerant flow channel 52-1, to perform heat dissipation of the anode electrode 18-2 (heat exchange with the anode electrode 18-2) later. Also in this way, the temperatures of the anode electrode 18-2 and the cathode electrode 20-1 can be regulated, to thereby cause the amount of heat dissipation (the amount of heat exchange) from the cathode electrode 20-1 into the cooling liquid flowing through the refrigerant flow channel 42-1 to be greater than the amount of heat dissipation (the amount of heat exchange) from the anode electrode 18-2 into the cooling liquid flowing through the refrigerant flow channel 52-1. Configurations other than those described above are identical to that of Embodiment 1 (the configuration example depicted in FIG. 1).

In this embodiment, efficiency of cooling the cathode electrode 20-1 by the cooling liquid which flows through the refrigerant flow channel 42-1 is increased, whereas efficiency of cooling the anode electrode 18-2 by the cooling liquid which flows through the refrigerant flow channel 52-1 is reduced. Therefore, similarly to Embodiments 1 and 2, because the amount of heat dissipation from the anode electrode 18-2 can be reduced to thereby increase the temperature of the anode electrode 18-2, the difference in temperature between the cathode electrode 20-2 and the anode electrode 20-2 can be suppressed in the fuel cell 14-2. In addition to this, because the amount of heat dissipation from the cathode electrode 20-1 can be increased to thereby reduce the temperature of the cathode electrode 20-1, the difference in temperature between the cathode electrode 20-1 and the anode electrode 18-1 can be suppressed in the fuel cell 14-1.

Figure 9:
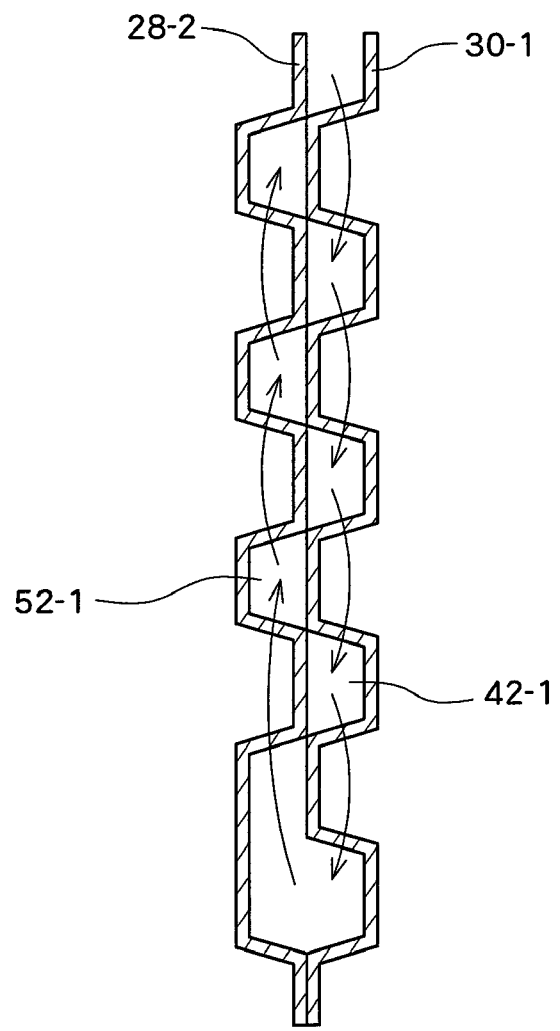
FIG. 9 is a diagram showing another schematic configuration of the fuel cell stack according to the third embodiment of the present invention.

In this embodiment, instead of the provision of the partition wall 54-1, the refrigerant flow channel 42-1 and the refrigerant flow channel 52-1 may be displaced with respect to each other along a direction perpendicular to the stack direction as shown in FIG. 9. Also in this configuration, after feeding the cooling liquid into the refrigerant flow channel 42-1 to first perform heat dissipation from the cathode electrode 20-1, the cooling liquid can be fed into the refrigerant flow channel 52-1 to subsequently perform heat dissipation from the anode electrode 18-2, as shown by arrows of FIG. 9.

Further, in this embodiment, communication between the refrigerant flow channel 42-1 for dissipating heat from the cathode electrode 20-1 and the refrigerant flow channel 52-1 for dissipating heat from the anode electrode 18-2 may be blocked to thereby establish the refrigerant flow channels 42-1 and 52-1 as separate cooling lines (cooling systems). Then, a flow rate of the cooling liquid supplied to the refrigerant flow channel 42-1 and a flow rate of the cooling liquid supplied to the refrigerant flow channel 52-1 are individually controlled in such a manner that the flow rate of the cooling liquid supplied to the refrigerant flow channel 42-1 becomes greater than that supplied to the refrigerant flow channel 52-1. Also in this way, the temperatures of the anode electrode 18-2 and the cathode electrode 20-1 can be regulated so as to cause the amount of heat dissipation from the cathode electrode 20-1 into the cooling liquid flowing through the refrigerant flow channel 42-1 to be greater than that of heat dissipation from the anode electrode 18-2 into the cooling liquid flowing through the refrigerant flow channel 52-1.

Still further, the partition wall having electrically conductive and thermally insulative properties may also be installed between the cathode side separator 30-9 in the fuel cell 14-9 and the anode side separator 28-10 in the fuel cell 14-10 in this embodiment. Then, after feeding the cooling liquid into a refrigerant flow channel formed between the partition wall and the anode side separator 28-10 (hereinafter referred to as an anode side refrigerant flow channel) to first perform heat dissipation from the anode electrode 18-10 in the fuel cell 14-10, the cooling liquid may be subsequently fed into a refrigerant flow channel formed between the partition wall and the cathode side separator 30-9 (hereinafter referred to as a cathode side refrigerant flow channel), to then perform heat dissipation from the cathode electrode 20-9 in the fuel cell 14-9. As a result, the temperatures of the anode electrode 18-10 and the cathode electrode 20-9 can be regulated, so as to cause the amount of heat dissipation from the anode electrode 18-10 into the cooling liquid flowing through the anode side refrigerant flow channel to be greater than the amount of heat dissipation from the cathode electrode 20-9 into the cooling liquid flowing through the cathode side refrigerant flow channel.

Alternatively, communication between the anode side refrigerant flow channel for dissipating heat from the anode electrode 18-10 and the cathode side refrigerant flow channel for dissipating heat from the cathode electrode 20-9 may be blocked to thereby establish the anode side refrigerant flow channel and the cathode side refrigerant flow channel as separate cooling lines (cooling systems). Then, the flow rate of the cooling liquid supplied to the anode side refrigerant flow channel and the flow rate of the cooling liquid supplied to the cathode side refrigerant flow channel are individually controlled in such a manner that the flow rate of the cooling liquid supplied to the anode side refrigerant flow channel becomes greater than that supplied to the cathode side refrigerant flow channel. Also in this way, the temperatures of the anode electrode 18-10 and the cathode electrode 20-9 can be regulated so as to cause the amount of heat dissipation from the anode electrode 18-10 to be greater than that of heat dissipation from the cathode electrode 20-9.

In the above explanation regarding Embodiments 1 through 3, the examples in which metallic separators are used for the anode side separator 28-$m$ and the cathode side separator 30-$m$ in the fuel cell 14-$m$ (where m is an integer from 1 through n) have been described. However, carbon separators may be used for the anode side separator 28-$m$ and the cathode side separator 30-$m$ in Embodiments 1 to 3.

In each of the above-described embodiments, the purpose of installing the heat insulating barrier between the adjacent fuel cells, or installing the refrigerant flow channel which causes, between the adjacent fuel cells, the amount of heat carried away by the refrigerant from one fuel cell situated toward the end part to be greater than that from the other fuel cell situated toward the center, is to suppress a pole situated toward the center in one fuel cell of adjacent fuel cells from undergoing a greater temperature increase compared with a pole situated toward the end part. In other words, a suppressing part (the heat insulating barrier or the refrigerant flow channel) which prevents, in mutually adjacent first and second fuel cells, one pole, which is situated toward the first fuel cell, of the two poles included in the second fuel cell located closer to the end part than the first fuel cell, from absorbing heat from the first fuel cell side, is newly provided in each of the embodiments. In this way, the difference in temperature between the poles in the second fuel cell is reduced, to thereby prevent generation of condensed water. Regarding the suppressing part adopted here, although suppressing parts each having almost the same performance may be provided at all sites between the fuel cells, the provision at all sites between the fuel cells is undesirable in light of warm up operation, downsizing, internal resistance and the like. Therefore, in each of the embodiments, reduction of temperature difference within one fuel cell is realized by configuring the suppressing parts (the heat insulating barriers or refrigerant flow channels) in such a manner that absorption of heat between the fuel cells is suppressed to a relatively greater extent as the fuel cells approaches the end part of the stack from the center. It should be noted that the reduction of temperature difference within one fuel cell can be achieved by installing, as the suppressing part, at least one of the heat insulating barriers or the refrigerant flow channels between the fuel cells.

Although the embodiments for carrying out the present invention have been described above, the present invention is not limited to the above-described embodiments, and may, of course, be embodied in various forms without departing from the scope of the invention.

The invention claimed is:

1. A fuel cell stack, comprising a stack of three or more fuel cells, wherein each of the fuel cells comprises:

an assembly in which an anode electrode and a cathode electrode are respectively joined to either side of an electrolytic membrane, the anode electrode being located closer to one end, in a stack direction of the fuel cells, than the cathode electrode; and a plurality of anode gas flow channels through which a fuel gas to be supplied to the anode electrode flows, a plurality of cathode gas flow channels through which an oxidant gas to be supplied to the cathode electrode flows, and a plurality of a refrigerant flow channels through which a refrigerant flows, which are formed independently from each other in the assembly;

wherein the plurality of refrigerant flow channels are disposed at a plurality of sites along the stack direction, each of the plurality of refrigerant flow channels dissipating heat between an anode electrode of one fuel cell of mutually adjacent fuel cells and a cathode electrode of the other fuel cell using the refrigerant;

wherein the plurality of refrigerant flow channels communicate with a refrigerant supply port and a refrigerant discharge port;

wherein in at least one but not all pairs of mutually adjacent fuel cells, a heat insulating barrier is installed between an anode electrode in one of a pair and a cathode electrode in the other of the pair, and one of the plurality of refrigerant flow channels is formed at one of between the heat insulating barrier and the anode electrode and between the heat insulating barrier and the cathode electrode, while an air layer which does not communicate with the refrigerant supply port and the refrigerant discharge port, and to which the refrigerant is not supplied, is formed at the other.

2. The fuel cell stack according to claim 1, wherein:
the heat insulating barrier is installed between an anode electrode of one fuel cell of mutually adjacent fuel cells which are located in a vicinity of an end part of the stack in the stack direction, and a cathode electrode of the other fuel cell, and one of the plurality of refrigerant flow channels is formed at one of between the heat insulating barrier and the anode electrode and between the heat insulating barrier and the cathode electrode, while an air layer which does not communicate with the refrigerant supply port and the refrigerant discharge port, and to which the refrigerant is not supplied, is formed at the other.

3. The fuel cell stack according to claim 1, further comprising a deformation restricting part for restricting deformation of the heat insulating barrier in the stack direction.

4. The fuel cell stack according to claim 3, wherein:
first and second separators are installed, between which the heat insulating barrier is retained along the stack direction, and
the deformation restricting part is provided on at least one of the first and second separators.

5. The fuel cell stack according to claim 4, wherein:
the deformation restricting part comprises a protruded portion which is provided on the first separator and protruded toward the second separator.

6. The fuel cell stack according to claim 5, wherein:
a part of the heat insulating barrier retained between the protruded portion and the second separator has stiffness higher than that of the other part of the heat insulating barrier.

7. The fuel cell stack according to claim 4, wherein:
the deformation restricting part comprises a first protruded portion which is provided on the first separator and protruded toward the second separator, and a second protruded portion which is provided on the second separator and protruded toward the first protruded portion so as to be opposed to the first protruded portion in the stack direction.

8. The fuel cell stack according to claim 7, wherein:
a part of the heat insulating barrier retained between the first protruded portion and the second protruded portion has stiffness higher than that of the other part of the heat insulating barrier.

9. The fuel cell stack according to claim 1, wherein:
an anode side terminal electrode and a cathode side terminal electrode are respectively disposed on either end of the stack in the stack direction.

10. The fuel cell stack according to claim 9, wherein:
a first heat insulating barrier is installed as the heat insulating barrier between the anode electrode in one fuel cell of mutually adjacent fuel cells located closest to the anode side terminal electrode and the cathode electrode in the other fuel cell, the one of the plurality of refrigerant flow channels is formed between the first heat insulating barrier and the cathode electrode, while an air layer which does not communicate with the refrigerant supply port and the refrigerant discharge port, and to which the refrigerant is not supplied, is formed at the other.

11. The fuel cell stack according to claim 10, wherein:
a second heat insulating barrier is disposed closer to one end, in the stack direction, than the anode electrode, in a fuel cell which is adjacent to the anode side terminal electrode.

12. The fuel cell stack according to claim 9, wherein:
the heat insulating barrier is installed between the anode electrode in one fuel cell of the mutually adjacent fuel cells located closest to the cathode side terminal electrode, and the cathode electrode in the other fuel cell, the one of the plurality of refrigerant flow channels is formed between the first heat insulating barrier and the cathode electrode, while an air layer which does not communicate with the refrigerant supply port and the refrigerant discharge port, and to which the refrigerant is not supplied, is formed at the other.

* * * * *

UNITED STATES PATENT AND TRADEMARK OFFICE
CERTIFICATE OF CORRECTION

PATENT NO. : 8,603,692 B2  Page 1 of 1
APPLICATION NO. : 12/374935
DATED : December 10, 2013
INVENTOR(S) : Yamashita et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1197 days.

Signed and Sealed this
Twenty-second Day of September, 2015

Michelle K. Lee
*Director of the United States Patent and Trademark Office*